United States Patent [19]
Nagasaka

[11] 3,973,748
[45] Aug. 10, 1976

[54] SUSTAINING DEVICE
[75] Inventor: Masuo Nagasaka, Neyagawa, Japan
[73] Assignee: Konan Camera Research Institute, Japan
[22] Filed: Jan. 31, 1975
[21] Appl. No.: 545,987

[52] U.S. Cl. .............................. 248/280; 248/281; 248/123
[51] Int. Cl.² .......................................... A47F 5/00
[58] Field of Search ........... 248/276, 280, 281, 292, 248/297, 123, 325; 108/136, 142

[56] References Cited
UNITED STATES PATENTS

| 316,459 | 4/1885 | How | 248/280 |
| 911,935 | 2/1909 | Baumwart | 248/280 |
| 1,272,845 | 7/1918 | McClean | 248/280 |
| 2,584,921 | 2/1952 | Rawnsley et al. | 248/280 |
| 3,239,184 | 3/1966 | Kirkeby | 248/280 |
| 3,280,322 | 10/1966 | Kirkeby | 248/280 |

FOREIGN PATENTS OR APPLICATIONS

| 1,200,736 | 12/1959 | France | 248/325 |

*Primary Examiner*—Robert A. Hafer
*Attorney, Agent, or Firm*—Eugene E. Geoffrey, Jr.

[57] ABSTRACT

A sustaining device for adjustably holding and positioning an article in space which includes a stationary member, a pair of links pivoted thereto and extending therefrom, a floating member pivoted to the outer ends of the links for movement in a vertical plane relative to the first member, a spring connected between said stationary member and said floating member to produce an upward moment to counterbalance the moment produced by the weight of the article and means coordinated with at least one of said members to equalize said moments throughout the range of vertical displacement of said article.

1 Claim, 4 Drawing Figures

SUSTAINING DEVICE

This invention relates to a sustaining device and more particularly to a device for adjustably retaining an article in an arbitrary spatial position. The present invention is effectively applicable to a device for sustaining an operating microscope, illuminating lamp or the like in a spatial position.

Sustaining devices of prior art generally comprise a four link mechanism consisting of a stationary member for holding a subject article and a pair of vertically arranged parallel connecting bars respectively pivoted at each end to the stationary member and the floating member, so that the four pivots form a parallelogram and the floating member, together with the subject article, can effect a parallel translation in the vertical direction, and a spring stretched between a point near the upper pivot on the stationary member and a point near the lower pivot on the floating member. Sometimes, two such mechanisms are combined for enabling spatial parallel translation in the both vertical and horizontal directions. In such device, however, the tension of the spring is balanced with the load applied to the floating member only at a specific angular position of the linkage and no equilibrium is obtainable in principle in the other positions, without taking the pivotal friction into consideration. Therefore, prior art devices have often encountered difficulty in that a stable repose was not obtainable in an arbitrary spatial position when the pivotal friction changed.

Accordingly, an object of this invention is to provide an improved sustaining device which can sustain an article in any spatial position with stable repose regardless of the variation of pivotal friction.

According to this invention, a cam surface is provided in the vicinity of the lower pivot on the floating member or the upper pivot on the stationary member, and a cord or strip connected to an end of the spring is laid along the cam surface. The profile of the cam surface is selected such that the moment caused by the tension of the spring about the pivots is equal in magnitude but opposite in direction to the moment caused by the load applied to the floating member.

The invention will now be described in detail hereinunder with reference to the accompanying drawings.

Figure 1:
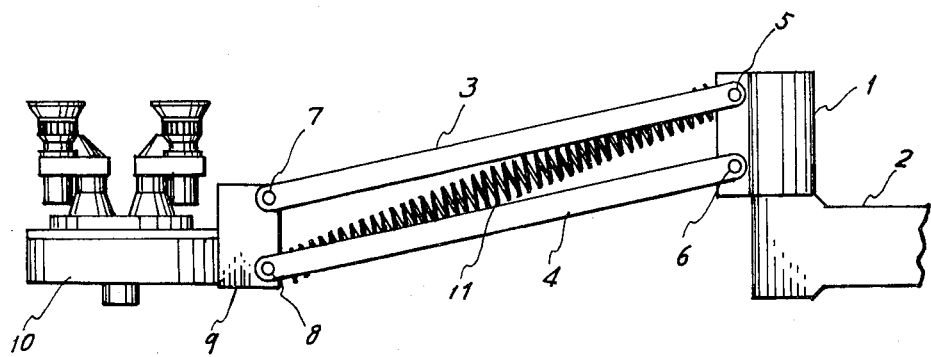
FIG. 1 is a side view representing a microscope sustaining device according to prior art.
Figure 2:
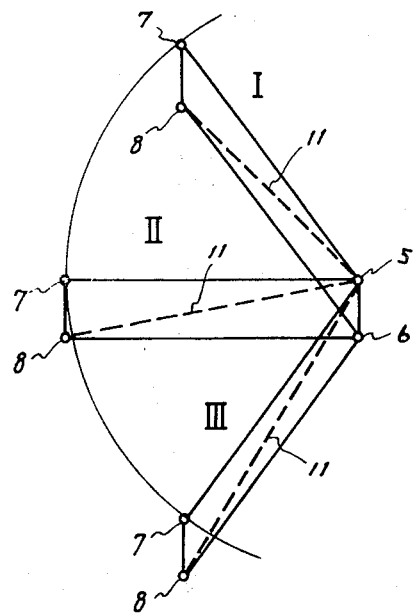
FIG. 2 is a diagram illustrative of movement of the device of FIG. 1.

Referring first to FIG. 1, a stationary member 1 is supported rotatably about a vertical axis on a supporting bracket 2 which is to be fixed to a suitable stand or pedestal. A pair of connecting bars 3 and 4 are pivoted at their ends 5 and 6 to the stationary member 1 and at their other ends 7 and 8 to the floating member 9. The distance between the pivots 5 and 6 is selected substantially equal to the distance between the pivots 7 and 8 so that the members 1, 3, 4 and 9 form a four link parallelogram mechanism which enables a parallel translation of the floating member 9 in the vertical direction. An operating microscope 10 is attached to the floating member 9. A spring 11 is stretched between the pivots 5 and 8 for drawing the floating member 9 upwardly together with the microscope 10. The tension of the spring 11 is adjusted or designed such that the moment provided upwardly about the pivots 5 and 6 by the tension of the spring 11 becomes equal to the moment provided downwardly about the same pivots by the weight of the microscope 10 applied to the floating member 9 in the position in which the microscope is used most frequently. However, as readily understood from FIG. 2 illustrating three positions I, II and III of the links, in which the four links are indicated with full lines between the four pivots 5, 6, 7 and 8 and the spring 11 is indicated with a dashed line between the pivots 5 and 8, the length of the spring 11 varies with the angle of rotation of the connecting bars 3 and 4 about the pivots 5 and 6, thereby changing its tension. As there is no means for balancing the spring force and the weight of the microscope in all of these positions, it is natural that perfect spatial repose of the microscope can not be obtained in those positions other than where the moments are balanced. In the prior devices, apparent repose has been obtained in these other positions by the aid of frictional resistance of the pivots 5, 6, 7 and 8. Therefore, the prior devices have encountered the problem that smoothness of the spatial movement was substantially affected by the pivotal friction but perfect repose was not obtainable with reduced friction.

Figure 3:
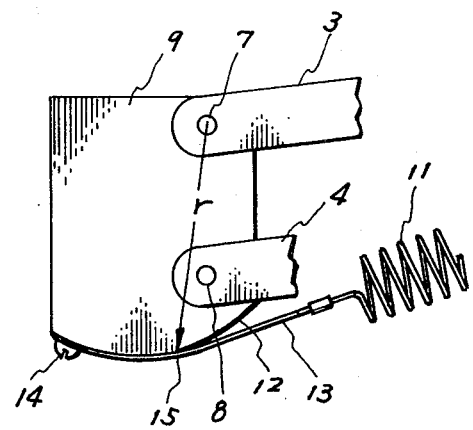
FIG. 3 is a side view representing a part of a sustaining device in accordance with the invention.

Referring to FIG. 3 representing a typical embodiment of a device in accordance with this invention, the bottom of the floating member 9 (as shown in FIG. 1) to which the connecting bars 3 and 4 are coupled with the pivots 7 and 8 is provided with a curved surface 12 in accordance with the teaching of this invention. One end of the spring 11 is fixed in the vicinity of the upper pivot 5 as in the prior art while the other end is coupled to one end of a flexible strip 13 which is laid along the surface 12. The other end of strip 13 is fixed to the surface 12 with a screw 14. The distance r from the upper pivot 7 to the point of contact 15 of the strip 13 with the surface 12 is previously selected as a function of the angle of rotation of the connecting bars 3 and 4, so that the moment caused by the spring 11 always balances with the moment caused by the microscope 10.

Figure 4:
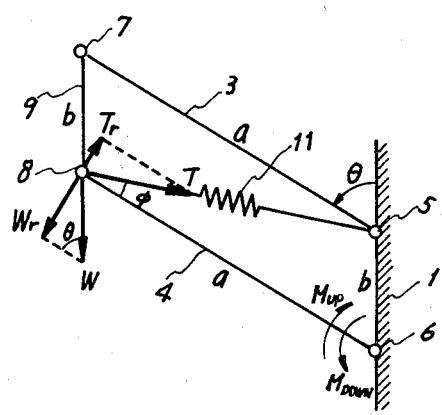
FIG. 4 is a force diagram for explaining the operation of an embodiment of this invention.

The design of the contour of the surface 12 will be analyzed with reference to FIG. 4. In this figure, the device is shown schematically as a parallelogram four link mechanism having two pairs of sides a and b, in which the link 1 is represented as a vertical stationary member of the device and the spring 11 is stretched between the pivots 5 and 8. Using $\phi$ as the angle between the spring 11 and the connecting bar 4 (or 5) and T as the spring tension, the moment ($M_{tp}$) given upwardly or clockwise about the pivot 5 (or 6) by the spring 11 can be given in the following form.

$$M_{tp} = aT_r = aT\sin\phi$$

$\sin\phi$ can be given as follows by using $\theta$ as the angle of rotation of the connecting bars 4 and 5 from the initial position as shown in the drawings.

$$\sin\phi = \frac{b\sin\theta}{\sqrt{a^2+b^2-2ab\cos\theta}}$$

Therefore, $$M_{UP} = \frac{ab\sin\theta}{\sqrt{a^2+b^2-2ab\cos\theta}} \cdot T$$

The spring tension T can be represented as follows by using the initial tension $T_0$ (when $\theta = 0$) and the elastic modulus $\alpha$.

$$T = T_0 + \alpha \left\{ \sqrt{a^2+b^2-2ab\cos\theta} - (a-b) \right\}$$

Therefore, $$M_{UP} = \frac{ab\sin\theta [T_0+\alpha \{\sqrt{a^2+b^2-2ab\cos\theta} - (a-b)\}]}{\sqrt{a^2+b^2-2ab\cos\theta}}$$

On the other hand, the moment ($M_{DOWN}$) given downwardly or counterclockwise about the same pivot by the gravity W is as follows.

$$M_{DOWN} = aW_r = aW\sin\theta$$

If the value $b$ is assumed as a variable $r$, the following equation must be fulfilled for obtaining equilibrium of the both moments $M_{UP}$ and $M_{DOWN}$.

$$\frac{a\sin\theta [T_0+\alpha \{\sqrt{a^2+r^2-2ar\cos\theta} - (a-r)\}]}{\sqrt{a^2+r^2-2ar\cos\theta}} \cdot r = aW\sin\theta$$

Therefore, $$\frac{T_0+\alpha \{\sqrt{a^2+r^2-2ar\cos\theta} - (a-r)\}}{\sqrt{a^2+r^2-2ar\cos\theta}} \cdot r = W$$

By solving this equation (3) with respect to $r$ and using this $r$ as the radius $r$ in FIG. 3, the contour of the surface 12 can be obtained as a function of the angle of rotation $\theta$. If desired however it has been found practically convenient to plot the contour of the surface 12 by solving it with specific values $T_0$ and $\alpha$ appropriately. In order to avoid error, it is preferable to select the value $r$ approximately equal to the value $b$.

As the weights of the link members 3, 4 and 9 and the spring 11 have been neglected in the above calculation, the contour of the surface 12 as calculated in this manner does not give a perfect equilibrium. However, due to pivotal friction, a substantial repose can be obtained generally by this contour itself. In order to obtain perfect repose, the effective weight of members can be included in the equation.

The above description has been made with reference to one embodiment of this invention. It should be noted that various changes and modifications can be made from this embodiment without departing from the true scope of this invention as defined in the accompanying claims.

I claim:
1. A sustaining device comprising a stationary member, a floating member for holding an article, a pair of vertically spaced parallel bars each pivoted at one end to the stationary member and at the other end to said floating member whereby said four pivots form the corners of a parallelogram, said floating member having a bottom surface portion curved in the plane of said bars, a flexible strip secured at one end to a point on said curved surface spaced outwardly from the pivots on said other ends of said bars and a spring connected between the other end of said strip and a point adjoining the upper one of the pivots on the stationary member, the contour of said curved surface being selected to produce in combination with said spring a moment about said pivots to substantially equalize the moment produced by said article.

* * * * *